(12) United States Patent
Hsieh et al.

(10) Patent No.: US 12,556,011 B2
(45) Date of Patent: Feb. 17, 2026

(54) CHARGING PILE WITH PERMANENTLY-HORIZONTAL CHARGING BLOCK AND CHARGING DEVICE HAVING THE SAME

(71) Applicants: Futaijing Precision Electronics (Yantai) Co., Ltd., Yantai (CN); HON HAI PRECISION INDUSTRY CO., LTD., New Taipei (TW)

(72) Inventors: Chang-Ju Hsieh, New Taipei (TW); Chih-Cheng Lee, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 912 days.

(21) Appl. No.: 17/844,918

(22) Filed: Jun. 21, 2022

(65) Prior Publication Data

US 2023/0068409 A1      Mar. 2, 2023

(30) Foreign Application Priority Data

Aug. 31, 2021   (CN) .......................... 202111014440.9

(51) Int. Cl.
*H02J 7/00*          (2006.01)
(52) U.S. Cl.
CPC .................................. *H02J 7/0042* (2013.01)

(58) Field of Classification Search
CPC ........ H02J 7/0042; H02J 7/00; H01H 3/3005; H01J 2201/025
See application file for complete search history.

(56) References Cited

U.S. PATENT DOCUMENTS

| | | | |
|---|---|---|---|
| 2005/0083011 A1* | 4/2005 | Yang | B60L 53/31 320/107 |
| 2013/0241470 A1* | 9/2013 | Kim | H04M 1/04 320/107 |
| 2024/0029697 A1* | 1/2024 | Yu | G10K 9/10 |

* cited by examiner

*Primary Examiner* — Julian D Huffman
*Assistant Examiner* — Sadia Kousar
(74) *Attorney, Agent, or Firm* — ScienBiziP, P.C.

(57) ABSTRACT

A charging block on top of a charging pile is provided, the power-free charging block naturally providing a large and perfectly horizontal contact surface for a rechargeable electronic device even when the charging pile is tilted or on an uneven surface and does not provide a gravitationally horizontal upper surface. The charging pile includes a bottom plate, an elastic member, a first connecting member, a second connecting member, and the charging block. The elastic member is disposed on the bottom plate, and abuts against the bottom plate and the elastic member. The first connecting member defines a groove facing away from the elastic member. The second connecting member includes a ball which can roll in the groove to achieve a horizontal balance.

17 Claims, 5 Drawing Sheets

CHARGING PILE WITH PERMANENTLY-HORIZONTAL CHARGING BLOCK AND CHARGING DEVICE HAVING THE SAME

FIELD

The subject matter herein generally relates to electric charging, and more particularly, to a charging pile and a charging device having the charging pile.

BACKGROUND

Electronic devices, such as robots, need to be charged when they run out of power. A charging pile includes a charging platform for providing electric energy. The robot can be charged when the robot is electrically connected to be the charging platform.

However, the charging platform may be tilted if the ground for supporting the charging platform is uneven. Thus, a contact area between the robot and the charging platform is reduced, which reduces a charging efficiency of the charging pile. Therefore, there is room for improvement in the art.

BRIEF DESCRIPTION OF THE DRAWINGS

Implementations of the present technology will now be described, by way of embodiment, with reference to the attached figures.

DETAILED DESCRIPTION

Figure 1:
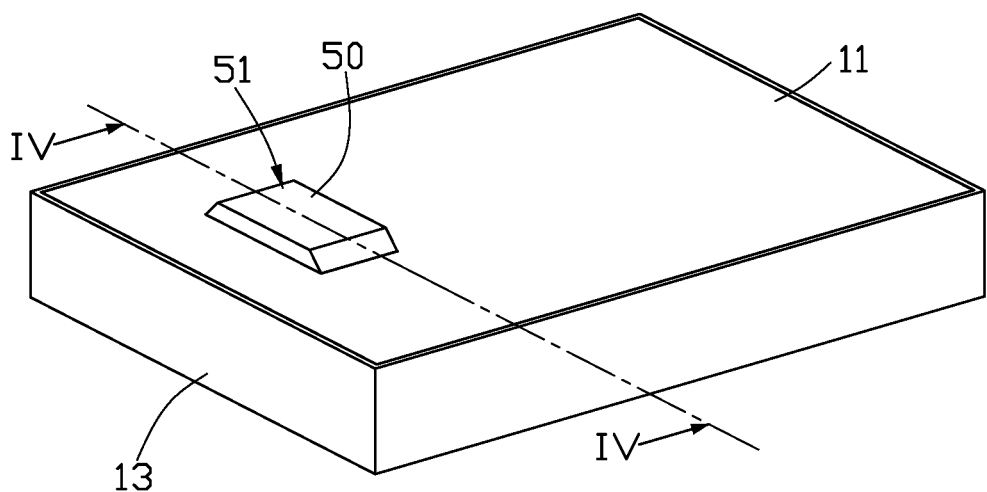
FIG. 1 is a diagrammatic view of a charging pile according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIGS. 1 to 4, a charging pile 100 is provided according to an embodiment of the present disclosure. The charging pile 100 can provide electric power to an electronic device 210 (shown in FIG. 5) such as a robot. The charging pile 100 includes a top plate 11, a bottom plate 12, a support plate 13, an elastic member 20, a first connecting member 30, a second connecting member 40, and a charging block 50. The bottom plate 12 and the top plate 11 are spaced from each other. The support plate 13 is connected between the bottom plate 12 and the top plate 11. The top plate 11, the bottom plate 12, and the support plate 13 cooperatively form a receiving cavity 14. The elastic member 20, the first connecting member 30, and the second connecting member 40 are disposed in the receiving cavity 14. The charging block 50 is at least partly disposed in the receiving cavity 14. In at least one embodiment, the top plate 11 defines a through hole 111 for receiving the charging block 50. The charging block 50 includes a top surface 51, a bottom surface 52 opposite the top surface 51, and a plurality of first sidewalls 53 connected between the top surface 51 and the bottom surface 52. The bottom surface 52 of the charging block 50 is placed in the receiving chamber 14. The top surface 51 of the charging block 50 protrudes from the through hole 111.

In at least one embodiment, a boss 121 protrudes from the bottom plate 12. The elastic member 20 is sleeved on the boss 121. The elastic member 20 has a first end 21 and a second end 22 opposite to the first end 21. The first end 21 abuts against the bottom plate 12, and the second end 22 protrudes from the boss 121. When the electronic device 210 needs to be charged, the electronic device 210 is disposed above the charging block 50 and applies a force downwards to the charging block 50 which compresses the elastic member 20. A rebounding force of the elastic member 20 pushes the charging block 50 upwards. The boss 121 avoids twisting of the elastic member 20 when the elastic member 20 is compressed. In at least one embodiment, the elastic member 20 may be a spring.

Figure 2:
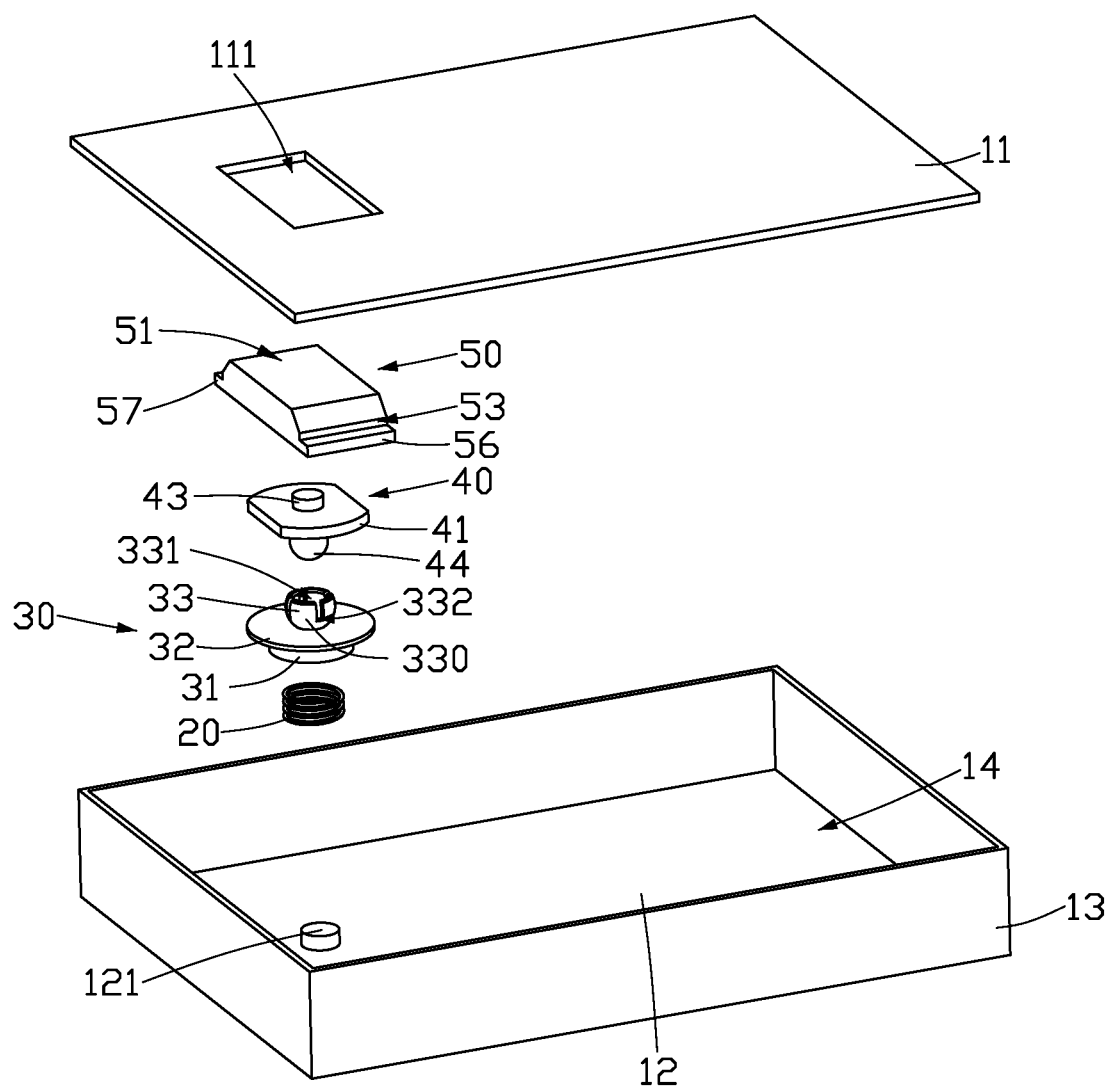
FIG. 2 is an exploded view of the charging pile of FIG. 1.
Figure 3:
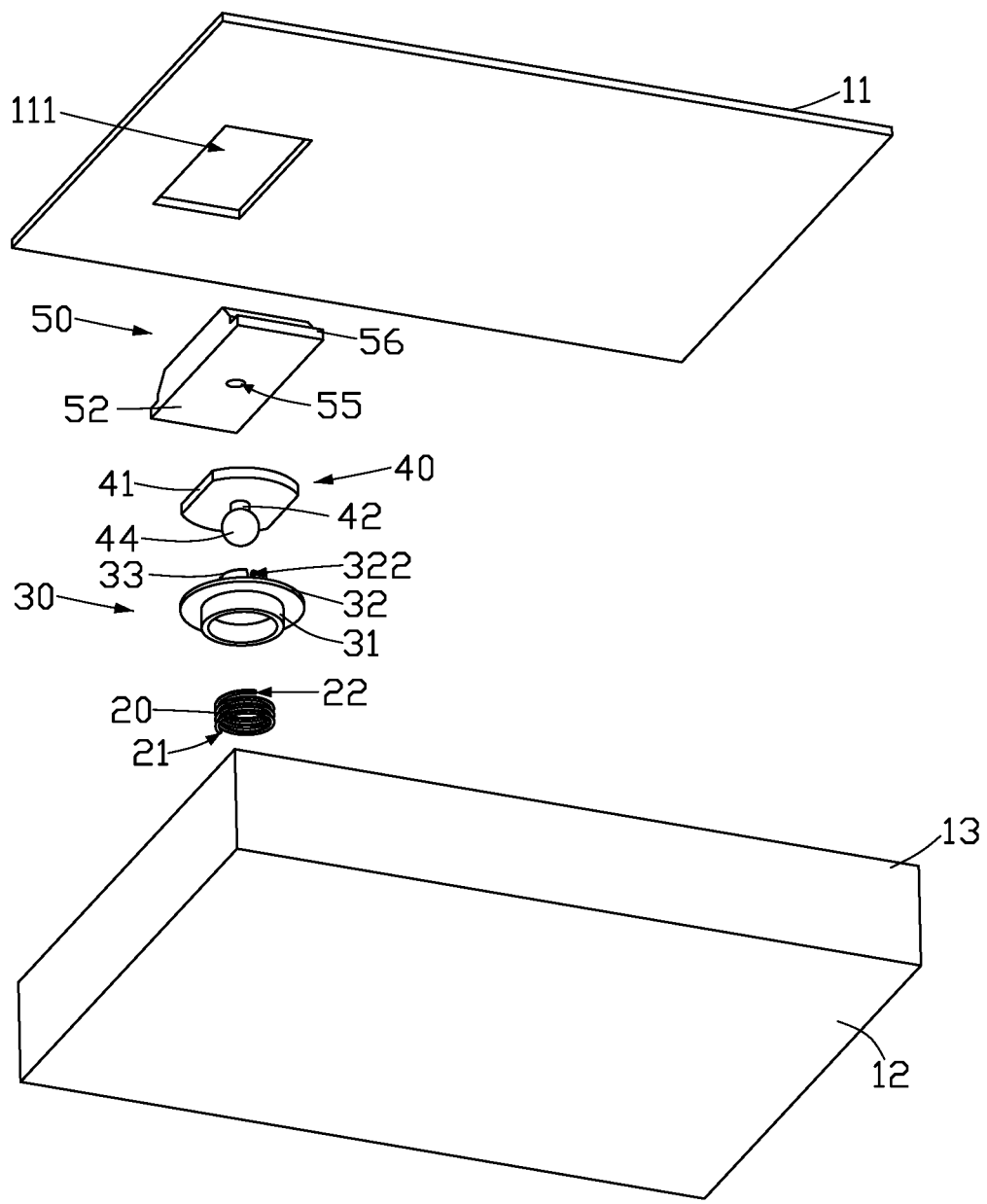
FIG. 3 is similar to FIG. 2, but showing the charging pile from another angle.
Figure 4:
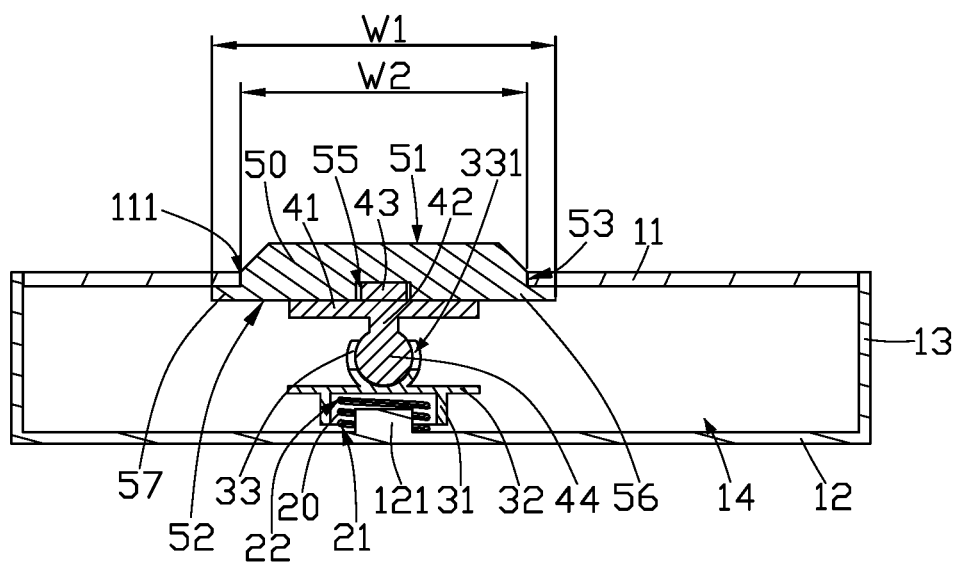
FIG. 4 is a diagrammatic view taken along IV-IV of FIG. 1.

Referring to FIGS. 2 to 4, the first connecting member 30 includes a collar 31, a bearing plate 32, and a ball holder 33. The collar 31 and the ball holder 33 are connected to opposite surfaces of the bearing plate 32. The collar 31, the bearing plate 32, and the ball holder 33 are arranged vertically along a direction from the bottom plate 12 to the top plate 11. The collar 31 is sleeved on the elastic member 20. The second end 22 of the elastic member 20 abuts against the bearing plate 32. The ball holder 33 includes a second sidewall 330 (shown in FIG. 2), and the second sidewall 330 forms a spherical groove 331 in the ball holder 33.

The second connecting member 40 includes a connecting plate 41, a connecting column 42, and a ball 44. The connecting plate 41 is fixed to the ball 44 through the connecting column 42. The ball 44, the connecting column 42, and the connecting plate 41 are arranged vertically along the direction from the bottom plate 12 to the top plate 11. The ball 44 is rotatably received in the groove 331, the ball 44 can thus rotate in the ball holder 33. The charging block 50 is disposed on a surface of the connecting plate 41 away from the ball 44. In at least one embodiment, the ball 44 is partially received in the groove 331. When installed, more than 50 percent of the ball 44 is held inside the groove 331. Thus, a stable connection is ensured between the ball 44 and the ball holder 33, which prevents separation of the ball 44 from the ball holder 33. In addition, at least ⅕ of the volume of the ball 44 is outside the groove 331, if too much of the ball 44 is held in the groove 331, an angle of rotation/range of the ball 44 is too limited.

Referring to FIG. 2, in at least one embodiment, the second sidewall 330 of the ball holder 33 defines a plurality of notches 332 communicating with the groove 331. Each of the notches 332 extends from an edge of the second sidewall 330 away from the bearing plate 32 to the bearing plate 32. In at least one embodiment, the ball holder 33 may be made of an elastic material. By defining the notches 332 on the ball holder 33, the cavity of the ball holder 33 into which the ball 44 can be loaded is increased, thereby facilitating the installation of the ball 44. In order to increase a structural strength of the ball holder 33, the notches 332 may be equally defined on the second sidewall 330 of the ball holder 33. Each of the notches 332 may be substantially square. In the embodiment, four equally-distributed notches 332 are defined on the sidewall of the ball holder 33.

Referring to FIGS. 3 and 4, in at least one embodiment, a positioning column 43 is provided on the surface of the connecting plate 41 away from the ball 44. The positioning column 43 may be arranged in a center of the surface of the connecting plate 41. A bottom surface 52 of the charging block 50 is recessed to form a slot 55, and the positioning column 43 is received in the slot 55. Thus, the charging block 50 can be quickly positioned and installed on the connecting plate 41. In other embodiments, a plurality of positioning columns 43 may be provided. The bottom surface 52 of the charging block 50 defines a plurality of slots 55 corresponding to the columns 43, which increases the positioning accuracy between the connecting plate 41 and the charging block 50.

Referring to FIGS. 2 and 4, in at least one embodiment, a first limiting block 56 and a second limiting block 57 are provided on two of the first side walls 53. Both the first limiting block 56 and the second limiting block 57 may be closer to the bottom surface 52 with respect to the top surface 51. A distance W1 between the first limiting block 56 and the second limiting block 57 is greater than a diameter W2 of the through hole 111, so that the first limiting block 56 and the second limiting block 57 are clamped with the through hole 111. When the elastic member 20 is in an original state, the first limit portion 56 and the second limit portion 57 are pressed against the top plate 11 to prevent the charging block 50 from separating from the through hole 111.

Referring to FIG. 4, when the electronic device 210 (see FIG. 5) is disposed on the charging block 50 for charging, the charging block 50 is pressed downward by gravity. Then, the connecting plate 41 drives the ball 44 to move downward to compress the elastic member 20. The compressed elastic member 20 generates a force on the connecting plate 41, so that the charging block 50 presses back against the electronic device 210. Thus, even when the bottom plate 12 fixed on inclined ground causing the charging plate 211 of the electronic device 210 to be only in partial contact with the top surface 51 of the charging block 50, the ball 44 rotates in the ball holder 33 because of unbalanced forces, so that the top surface 51 of the charging block 50 moves to become horizontal and make full contact with the charging plate 211, thereby improving the charging efficiency and reducing a loss of electric energy.

In other embodiments, a plurality of charging blocks 50 may be included in the charging pile 100, which are disposed in the receiving cavity 14. The corresponding first connecting member 30, the corresponding second connecting member 40, and the corresponding elastic member 20 are placed under each charging block 50. Thus, the charging pile 100 can simultaneously provide the electric energy to a number of electronic devices 210.

Figure 5:
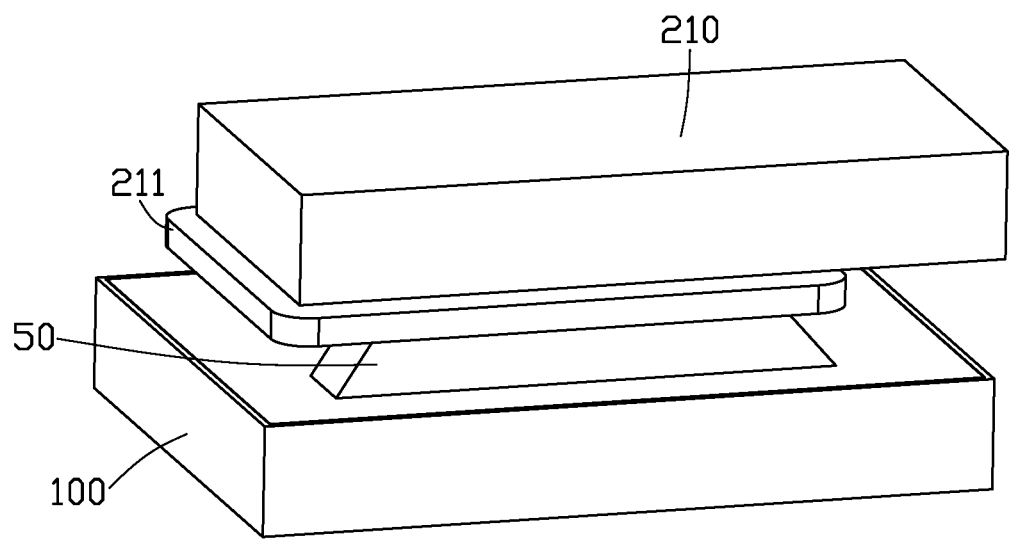
FIG. 5 is a diagrammatic view of a charging device according to an embodiment of the present disclosure.

Referring to FIG. 5, a charging device 200 is also provided according to an embodiment of the present disclosure. The charging device 200 includes the charging pile 100 and the electronic device 210. The charging pile 100 is electrically connected to and provides electric energy to the electronic device 210. The electronic device 210 includes a charging board 211, which is electrically connected to the charging block 50. The electronic device 210 may be a robot or an electric vehicle.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A charging pile comprising:
   a bottom plate;
   an elastic member disposed on the bottom plate;
   a first connecting member, the elastic member abutted against the bottom plate and the first connecting member, the first connecting member defining a groove facing away from the elastic member;
   a second connecting member comprising a ball rotatably received in the groove; and
   a charging block connected to the ball and facing away from the groove;
   wherein a boss is provided on the bottom plate, the elastic member is sleeved on the boss, the elastic member has a first end and a second end opposite to the first end, the first end is abutted against the bottom plate, and the second end protrudes from the boss;
   wherein the first connecting member further comprises a collar and a bearing plate fixed on the collar, the collar is sleeved on the elastic member and spaced from the bottom plate, and the second end is abutted against the bearing plate.

2. The charging pile according to claim 1, wherein the first connecting member further comprises a ball holder, the collar and the ball holder are connected to two opposite surfaces of the bearing plate, the ball holder comprises a second sidewall, the second sidewall forms the groove, and the ball is partially received in the groove.

3. The charging pile according to claim 2, wherein more than 50 percent of the ball is received inside the groove.

4. The charging pile according to claim 2, wherein at least ⅕ of the ball is disposed outside the groove.

5. The charging pile according to claim 2, wherein the second sidewall of the ball holder defines a plurality of notches communicating with the groove.

6. The charging pile according to claim 1, wherein the second connecting member further comprises a connecting plate and a connecting column, the ball is connected to the connecting plate through the connecting column, the charging block is connected to a surface of the connecting plate away from the ball.

7. The charging pile according to claim 6, wherein a positioning column is provided on the surface of the connecting plate away from the ball, a surface of the charging block facing the connecting plate defines a slot, and the positioning column is received in the slot.

8. The charging pile according to claim 1, further comprising a top plate, wherein the top plate is spaced from the bottom plate, the top plate defines a through hole, the charging block comprises a top surface facing away from the groove, a bottom surface opposite to the top surface, and a plurality of first sidewalls connected between the top surface and the bottom surface, and the top surface protrudes out of the through hole.

9. The charging pile according to claim 8, wherein a limiting block is provided on at least one of the plurality of first sidewalls, the limiting block is disposed between the top plate and the bottom plate and clamped with the through hole.

10. A charging device comprising:
an electronic device; and
a charging pile configured to electrically connecting to and provide electric power to the electronic device, the charging pile comprising:
a bottom plate;
an elastic member disposed on the bottom plate;
a first connecting member, the elastic member abutted against the bottom plate and the first connecting member, the first connecting member defining a groove facing away from the elastic member;
a second connecting member comprising a ball rotatably received in the groove; and
a charging block connected to the ball and facing away from the groove;
wherein a boss is provided on the bottom plate, the elastic member is sleeved on the boss, the elastic member has a first end and a second end opposite to the first end, the first end is abutted against the bottom plate, and the second end protrudes from the boss;
wherein the first connecting member further comprises a collar and a bearing plate fixed on the collar, the collar is sleeved on the elastic member and spaced from the bottom plate, and the second end is abutted against the bearing plate.

11. The charging device according to claim 10, wherein the first connecting member further comprises a ball holder, the collar and the ball holder are connected to two opposite surfaces of the bearing plate, the ball holder comprises a second sidewall, the second sidewall forms the groove, and the ball is partially received in the groove.

12. The charging device according to claim 11, wherein more than 50 percent of the ball is received inside the groove.

13. The charging device according to claim 11, wherein at least ⅕ of the ball is disposed outside the groove.

14. The charging device according to claim 11, wherein the second sidewall of the ball holder defines a plurality of notches communicating with the groove.

15. The charging device according to claim 10, wherein the second connecting member further comprises a connecting plate and a connecting column, the ball is connected to the connecting plate through the connecting column, the charging block is connected to a surface of the connecting plate away from the ball.

16. The charging device according to claim 15, wherein a positioning column is provided on the surface of the connecting plate away from the ball, a surface of the charging block facing the connecting plate defines a slot, and the positioning column is received in the slot.

17. A charging pile comprising:
a bottom plate;
an elastic member disposed on the bottom plate;
a first connecting member, the elastic member abutted against the bottom plate and the first connecting member, the first connecting member defining a groove facing away from the elastic member;
a second connecting member comprising a ball rotatably received in the groove; and
a charging block connected to the ball and facing away from the groove;
wherein the elastic member has a first end and a second end opposite to the first end, the first end is abutted against the bottom plate, the first connecting member further comprises a collar and a bearing plate fixed on the collar, the collar is sleeved on the elastic member and spaced from the bottom plate, and the second end is abutted against the bearing plate.

* * * * *